United States Patent
Fujimoto et al.

(10) Patent No.: US 8,850,915 B2
(45) Date of Patent: Oct. 7, 2014

(54) STRADDLE-RIDE TYPE VEHICLE

(75) Inventors: Yasushi Fujimoto, Wako (JP); Kinya Mizuno, Wako (JP); Yoshiaki Tsukada, Wako (JP); Takashi Ozeki, Wako (JP); Kazuhiko Nakamura, Wako (JP); Mitsuo Nakagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 377 days.

(21) Appl. No.: 13/432,749

(22) Filed: Mar. 28, 2012

(65) Prior Publication Data

US 2012/0247243 A1  Oct. 4, 2012

(30) Foreign Application Priority Data

Mar. 31, 2011  (JP) ................. 2011-077073

(51) Int. Cl.
| | |
|---|---|
| F16H 3/08 | (2006.01) |
| B62K 25/28 | (2006.01) |
| F16H 3/00 | (2006.01) |
| F16H 3/16 | (2006.01) |

(52) U.S. Cl.
CPC .............. *F16H 3/006* (2013.01); *B62K 25/283* (2013.01); *F16H 3/16* (2013.01)
USPC .............. 74/331; 74/329; 74/337.5; 180/230; 180/227

(58) Field of Classification Search
CPC ....... F16H 63/18; F16H 3/006; F16H 61/688; F16H 2059/0234; F16H 59/02; F02B 61/02; F02B 61/06; B60W 10/113; B60W 2300/185; B60W 2300/36; B62K 11/04; B60Y 2200/12
USPC ........ 74/325, 329, 331, 333, 340, 335, 337.5; 180/227, 230
See application file for complete search history.

(56) References Cited

U.S. PATENT DOCUMENTS

| | | | |
|---|---|---|---|
| 7,823,684 B2* | 11/2010 | Shiozaki et al. | 180/292 |
| 8,104,562 B2* | 1/2012 | Maehara et al. | 180/219 |
| 8,567,276 B2* | 10/2013 | Saitoh | 74/340 |
| 2009/0107429 A1* | 4/2009 | Maehara et al. | 123/90.12 |
| 2009/0107750 A1* | 4/2009 | Maehara et al. | 180/219 |
| 2010/0107810 A1* | 5/2010 | Saitoh | 74/664 |
| 2010/0206253 A1* | 8/2010 | Fujimoto et al. | 123/90.15 |
| 2010/0242655 A1* | 9/2010 | Ieda et al. | 74/473.1 |
| 2012/0247254 A1* | 10/2012 | Mizuno et al. | 74/473.16 |
| 2013/0062135 A1* | 3/2013 | Saitoh et al. | 180/230 |
| 2013/0081895 A1* | 4/2013 | Nomura et al. | 180/220 |

FOREIGN PATENT DOCUMENTS

JP  2008-303939 A  12/2008

* cited by examiner

*Primary Examiner* — Troy Chambers
*Assistant Examiner* — Valentin Craciun
(74) *Attorney, Agent, or Firm* — Birch, Stewart, Kolasch & Birch, LLP

(57) ABSTRACT

To achieve downsizing of a power unit and the vicinity thereof by permitting compact axial arrangement in a straddle-ride type vehicle on which the power unit having a twin-clutch type transmission is mounted. The transmission has a pair of main shafts with respective different axes and corresponding clutches. One of respective axial centers of the main shafts is disposed on one (above) of the sides with respect to a line and the other is disposed on the other side (below), the line connecting an axial center of the counter shaft with an axial center of a pivot shaft, as viewed in side elevation from the axial direction of the main shafts and counter shaft.

18 Claims, 6 Drawing Sheets

STRADDLE-RIDE TYPE VEHICLE

CROSS-REFERENCE TO RELATED APPLICATIONS

This application claims priority under 35 U.S.C. §119(a) to Application No. 2011-077073, filed in Japan on Mar. 31, 2011. The entirety of the above-identified application is expressly incorporated herein by reference.

BACKGROUND OF THE INVENTION

1. Field of the Invention

The present invention relates to a straddle-ride type vehicle on which a power unit provided with a twin-clutch type transmission is mounted, the transmission having main shafts with respective different axes and corresponding clutches.

2. Description of Background Art

Vehicle power units provided with a twin-clutch type transmission have heretofore been known (see, e.g. Japanese Patent Laid-Open No. 2008-303939). This twin-clutch type transmission includes a plurality of speed-change gear trains installed to be selectively established between a pair of main shafts arranged parallel to each other and a counter shaft having an axis parallel to the main shafts. In addition, the pair of main shafts is each coaxially provided with a clutch connecting and disconnecting power transmission from a crankshaft. This power unit is more advantageous than that having a pair of clutches arranged to coaxially overlap each other in that an increase in the axial width of the power unit is suppressed.

SUMMARY OF THE INVENTION

Incidentally, a power unit having a pair of main shafts with respective different axes and corresponding clutches as in the conventional technology described above has a tendency to increase space for arranging the shafts compared with a power unit having main shafts and corresponding clutches located on the same axis. Therefore, if such a power unit is used for a small-sized vehicle (a straddle-ride type vehicle) such as a motorcycle or the like, the size of a vehicle body is influenced.

Straddle-ride type vehicles such as motorcycles are such that a swing arm is vertically swingably attached at a front portion to the rear portion of a crankcase via a pivot shaft and a rear wheel, serving as a drive wheel, is rotatably supported by the rear portion of the swing arm. However, a power unit having two main shafts tends to increase the distance from the crankshaft to the pivot shaft compared with a power unit having one main shaft. Thus, there is a problem of enlarging a vehicle.

It is an object of the present invention to achieve downsizing of a power unit and the vicinity thereof by enabling compact axial arrangement in a straddle-ride type vehicle on which the power unit having a twin-clutch type transmission is mounted, the transmission having a pair of main shafts having respective different axes and corresponding clutches.

According to a first aspect of the present invention, as solving means for the above, is a straddle-ride type vehicle (1) including:

a power unit (10), the power unit (10) including: a crankshaft (21); first and second main shafts (31, 32) disposed in this order from the crankshaft (21) side; a counter shaft (35) straddling and engaging the main shafts (31, 32); a crankcase (14) rotatably supporting the crankshaft (21), the main shafts (31, 32) and the counter shaft (35) in a parallel manner; first and second clutches (33, 34) installed at corresponding one end portions of the main shafts (31, 32) and individually connecting and disconnecting the transmission of rotational power from the crankshaft (21) to the main shafts (31, 32); and a plurality of gear trains (36a, 36c, 36e, 37b, 37d, 37f) for speed-change stages, each of the plurality of gear trains being located on a corresponding one of the main shafts (31, 32) and the counter shaft (35) and selectively established by turning of a shift drum (52) parallel to the shafts (31, 32, 35);

a swing arm (9) supporting a drive wheel (11) at a rear portion; and a pivot shaft (27) disposed behind a crankcase (14), and parallel with the first and second main shafts (31, 32) and with the counter shaft (35) and vertically swingably supporting a front portion of the swing arm (9), wherein the power unit (10) is configured to switch the speed-change stages by changing the clutches (33, 34) and transmitting power to the drive wheel (11) from an end portion of the counter shaft (35) projecting from the crankcase (14) and wherein one of respective axial centers (C3, C4) of the first and second main shafts (31, 32) is disposed on one side with respect to a line (SL2) and the other of the respective axial centers of the first and second main shafts (31, 32) is disposed on the other side of the line (SL2), said line (SL2) connecting an axial center (C5) of the counter shaft (35) with an axial center (C7) of the pivot shaft (27), as viewed in side elevation from the axial direction of the main shafts (31, 32) and the counter shaft (35).

The straddle-ride type vehicle includes all vehicles in which a driver straddles and mounts a vehicle body. In addition, the straddle-ride type vehicle includes not only motorcycles (including a scooter-type vehicle) but also three-wheeled vehicles (including front-one- and rear-two-wheeled vehicles as well as front-two- and rear-one-wheeled vehicles) and four-wheeled vehicles.

According to a second aspect of the present invention, as viewed in side elevation from the axial direction of the shafts (31, 32, 35), the line (SL2) is inclined rearward downward and one (C4) of the respective axial centers (C3, C4) of the main shafts (31, 32) is disposed obliquely rearward of and above the line (SL2) and the other (C3) is disposed obliquely forward of and below the line (SL2).

According to a third aspect of the present invention, as viewed in side elevation from the axial direction of the shafts (31, 32, 35), one (C4) of the respective axial centers (C3, C4) of the main shafts (31, 32) is disposed above a second line (BL) and the other (C3) is disposed below the second line (BL), the second line (BL) connecting the axial center (C2) of the crankshaft (21) with the axial center (C7) of the pivot shaft (27).

According to a fourth aspect of the present invention, as viewed in side elevation from the axial direction of the shafts (31, 32, 35), one (C4) of the respective axial centers (C3, C4) of the main shafts (31, 32) is disposed above a third line (SL3) and the other (C3) is disposed below the third line (SL3), the third line (SL3) connecting the axial center (C2) of the crankshaft (21) with the axial center (C5) of the counter shaft (35).

According to a fifth aspect of the present invention, the clutches (33, 34) are disposed to vertically overlap each other at least in part.

According to a sixth aspect of the present invention, a portion, located on a rear side, of each of the clutches (33, 34) and the pivot shaft (27) are disposed to vertically overlap each other at least in part.

According to a seventh aspect of the present invention, a portion, located on a rear side, of each of the clutches (33, 34) is disposed above each of the lines (SL2, SL3, BL).

According to first through fourth aspects of the present invention, the main shafts are disposed to be offset from the lines (to be divided above and below the lines). Therefore, the distance from the crankshaft to the pivot shaft can be shortened, so that the vicinity of the power unit can be formed in a compact manner. In addition, the main shafts are disposed to be divided back and forth with the line inclined rearward downward put therebetween. Therefore, the height of the crankcase can be reduced.

According to the fifth aspect of the present invention, the housing space for the clutches is decreased, and therefore, the crankcase can be shortened in the back and forth direction.

According to the sixth aspect of the present invention, the pivot shaft can be disposed close to the crankcase.

According to the seventh aspect of the present invention, it becomes easy to dispose the pivot shaft at a position behind and below the crankcase and the degree of freedom of arrangement of the counter shaft or an output shaft and the pivot shaft can be increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
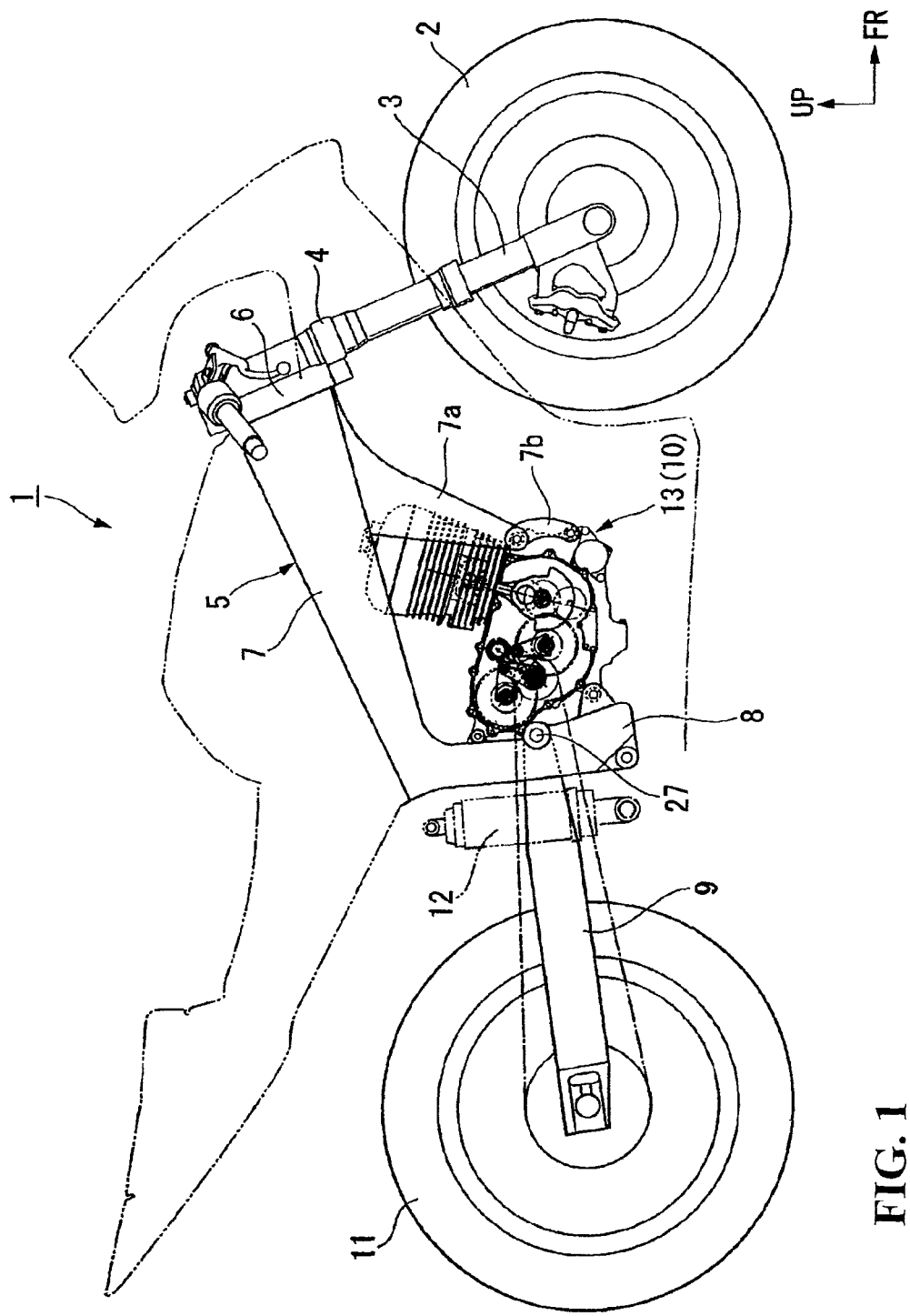
FIG. 1 is a right lateral view of a motorcycle according to an embodiment of the present invention.

The present invention will now be described with reference to the accompanying drawings, wherein the same reference numerals have been used to identify the same or similar elements throughout the several views. Incidentally, directions such as front, back or rear, left and right are the same as that of a vehicle described below unless otherwise described. In addition, arrow FR indicating the front of the vehicle, arrow LH indicating the left of the vehicle, and arrow UP indicating the upside of the vehicle are shown in place in the figures used in the following description.

A motorcycle (a straddle-ride type vehicle) 1 shown in FIG. 1 is such that a front fork 3 rotatably supporting a front wheel 2 is steerably supported at an upper portion by a head pipe 6 located at a front end of a body frame 5 via a steering stem 4. A main frame 7 extends obliquely downward and rearward from the head pipe 6 and is connected at a rear end portion to an upper end portion of the pivot frame 8. The swing arm 9 is vertically swingably supported at a front end by a vertically intermediate portion of the pivot frame 8. The swing arm 9 rotatably supports a rear wheel 11 at a rear end portion. A cushion unit (or shock absorber) 12 is interposed between a front portion of the swing arm 9 and the rear portion of the body frame 5. Incidentally, reference numeral 27 identifies a pivot shaft or a swing shaft of the swing arm 9, 7a identifies a down frame extending obliquely downward and rearward from the front lower side of the main frame 7, and 7b identifies a hanger bracket attached to the leading end of the down frame 7a.

A power unit 10 or a power machine of the motorcycle 1 is mounted on the body frame 5.

With additional reference to FIG. 2, the power unit 10 integrally includes an air-cooled single-cylinder engine (hereinafter simply called the engine) 13 constituting the front part thereof and a twin-clutch transmission (hereinafter simply called the transmission) continuous with the rear portion of the engine.

The engine 13 has a basic configuration in which a cylinder 15 is installed on a crankcase 14 in such a standing posture as to be inclined forwardly with respect to the vertical direction. Incidentally, reference numeral C1 in the figure identifies a cylinder axis along the standing direction of the cylinder 15. The power unit 10 is fixedly supported by the body frame 5 as below. The upper and lower front end portions of the crankcase 14 are fastened to the corresponding lower ends of the down frame 7a and of the hanger bracket 7b by means of bolts or the like. In addition, the upper and lower rear end portions of the crankcase 14 are fastened to the corresponding upper and lower portions of the pivot frame 8 by means of bolts or the like. Incidentally, symbols M1 and M2 denote front frame fixing portions located at the corresponding upper and lower front end portions of the crankcase 14. In addition, symbols M3 and M4 identify rear frame fixing portions located at the corresponding upper and lower rear end portions of the crankcase 14.

The cylinder 15 has a cylinder main body 16, a cylinder head 17 and a head cover 17a (see FIG. 5) in the order from the crankcase 14 side. Inlet system components are connected to the rear portion (the intake side) of the cylinder head 17 and exhaust system components are connected to the front (the exhaust side) of the cylinder head 17 (both are not shown).

A piston 18 reciprocating along the cylinder axis C1 is fitted into the cylinder main body 16. The reciprocation of the piston 18 is converted into the rotation of the crankshaft 21 via a connecting rod 19.

Figure 2:
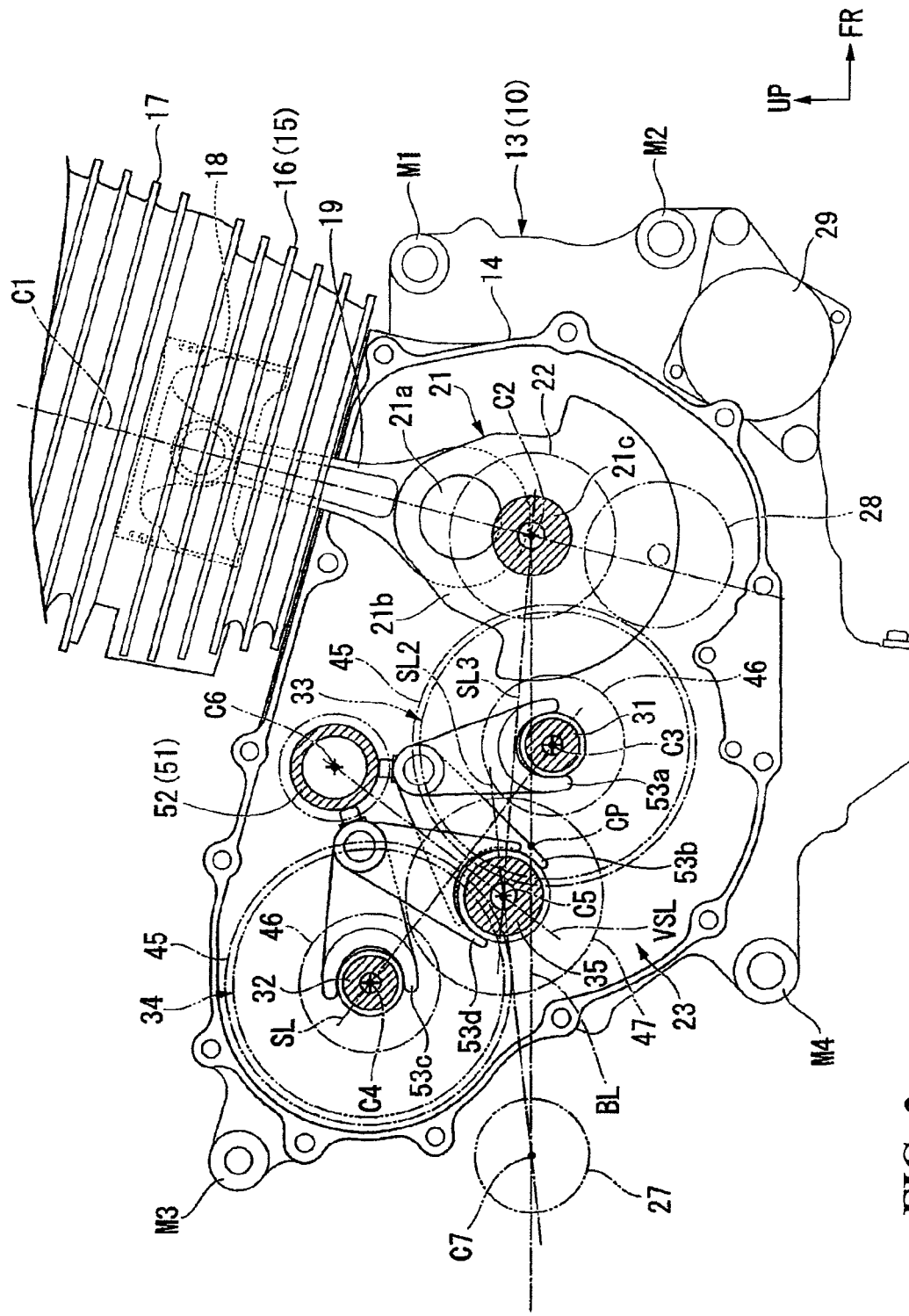
FIG. 2 is a right lateral view of a power unit of the motorcycle.
Figure 3:
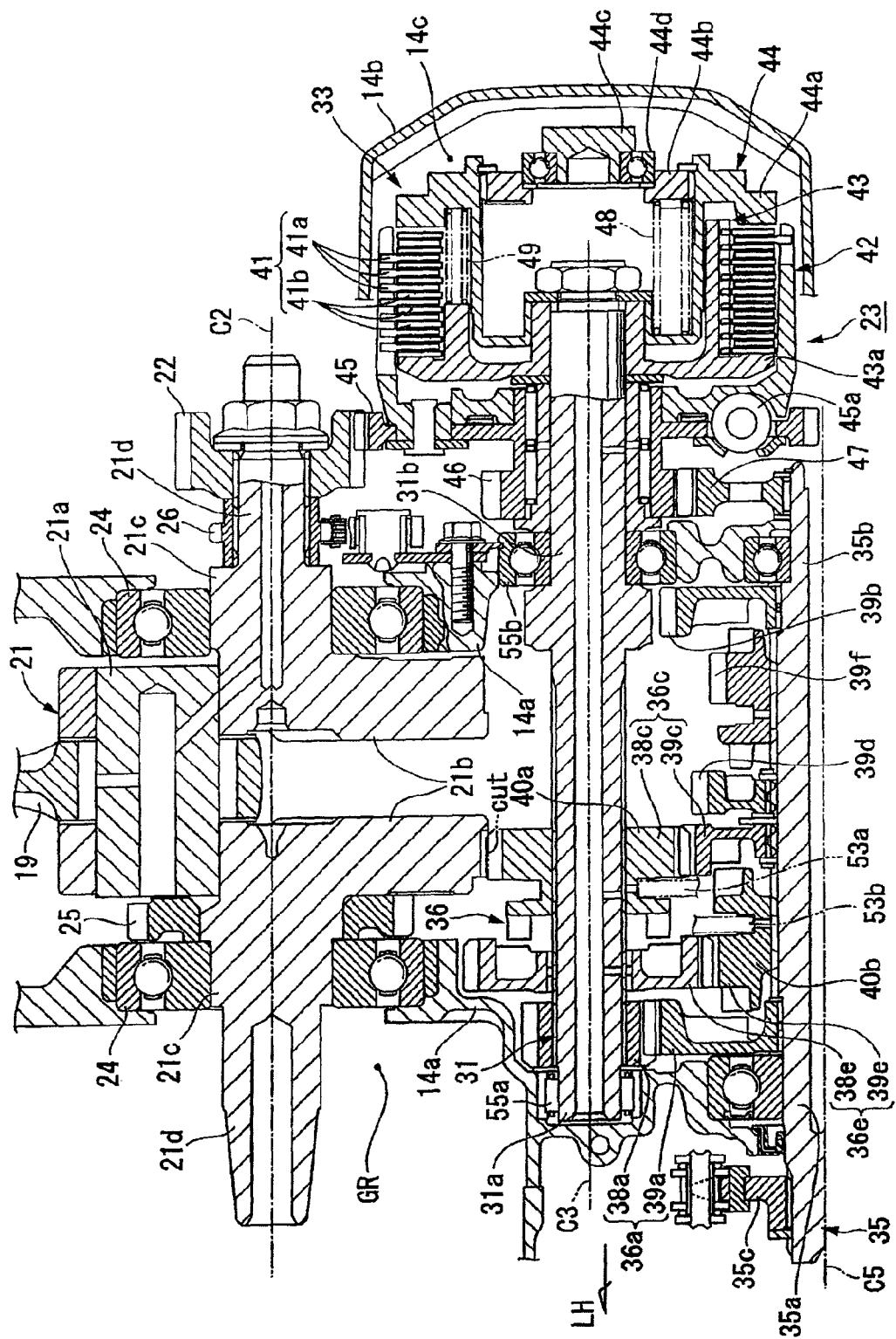
FIG. 3 is a cross-sectional view in parallel with axes in the vicinity of a crankshaft and a first main shaft of the power unit.

Referring to FIGS. 2 and 3, the crankshaft 21 includes a pair of left and right crank webs 21b supporting a crank pin 21a; left and right journal portions 21c projecting left and right outward from the corresponding left and right crank webs 21b; and left and right support shafts 21d further extending left and right outward from the corresponding left and right journal portions 21c. The left support shaft 21d integrally rotatably supports the rotor of an alternator (not shown). The right support shaft 21d integrally rotatably supports a primary drive gear 22 for transmitting power to the transmission 23.

Incidentally, in FIG. 3, symbol C2 identifies a rotational central axis (a crank axis), of the crankshaft 21 (the left and right journal portions 21c), extending in the horizontal direction. Reference numeral 24 identifies left and right radial ball bearings rotatably supporting the corresponding left and right journal portions 21c with respect to corresponding left and right lateral wall portions 14a of the crankcase 14. Reference numeral 25 identifies an oil pump drive gear located between and integrally rotatably supported by the left crank web 21b and the left journal portion 21c. Reference numeral 26 identifies a cam drive sprocket located between and integrally rotatably supported by the right journal portion 21c and the primary drive gear 22.

In FIG. 2, reference numeral 27 identifies a pivot shaft extending in the horizontal direction and supporting the front end portion of the swing arm 9. Symbol C7 identifies a swing central axis (a pivot axis), of the pivot shaft 27, extending in the horizontal direction. Reference numeral 28 identifies an oil pump disposed below the crankshaft 21 in the crankcase 14. Reference numeral 29 identifies a starter motor mounted to the lower side of the front end portion of the crankcase 14.

Referring to FIG. 2, the crankcase 14 has a rear portion housing the transmission 23 installed in a power transmission route between the engine 13 and the drive wheel and a change mechanism 51 switching the speed-change stages of the transmission 23. The rotational power of the crankshaft 21 is outputted to the rear left side of the crankcase 14 via the transmission 23 and then transmitted to the rear wheel 11 via, e.g. a chain-type power transmission mechanism.

Figure 4:
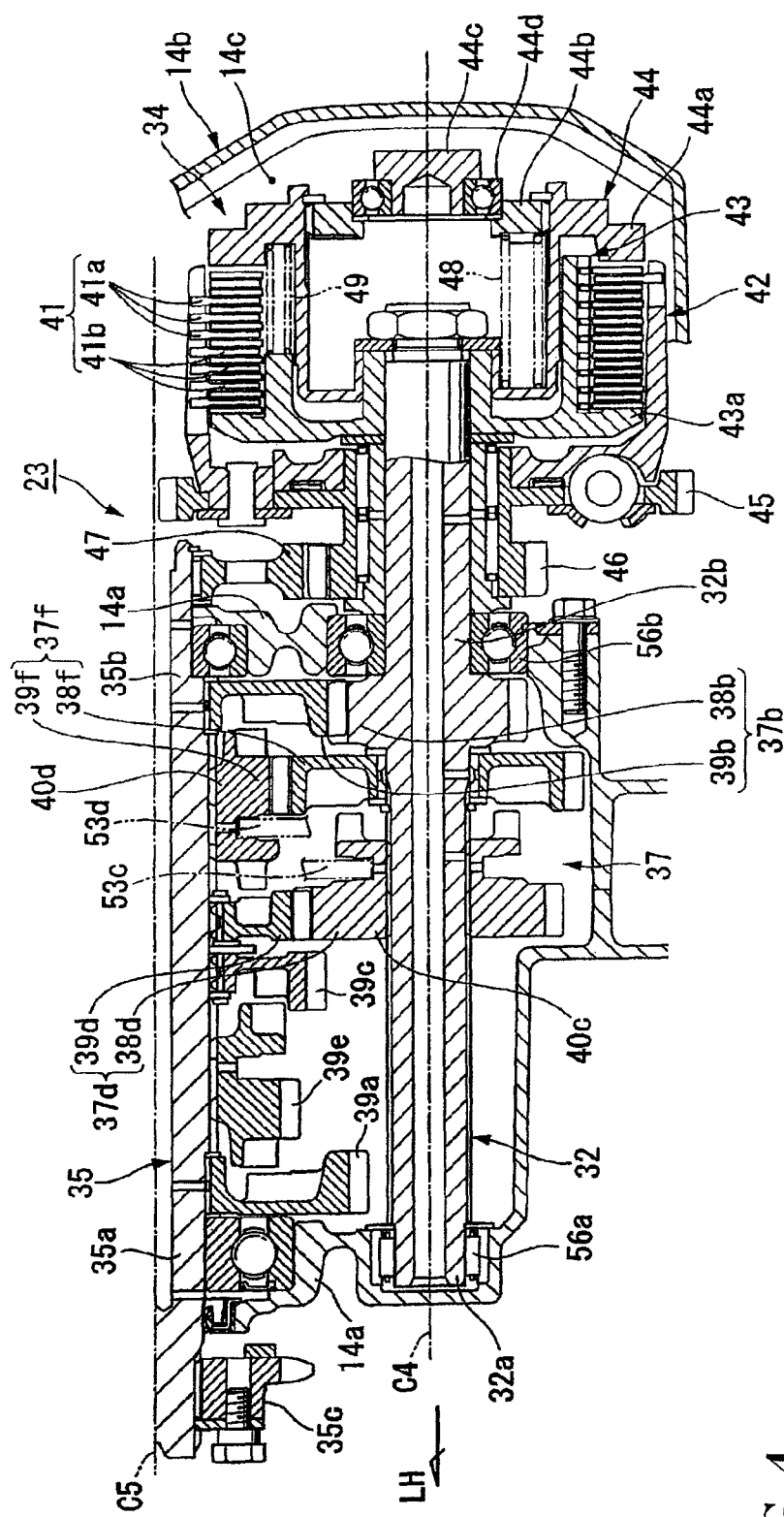
FIG. 4 is a cross-sectional view in parallel with axes in the vicinity of a second main shaft of the power unit.

With additional reference to FIGS. 3 and 4, the transmission 23 includes first and second main shafts 31, 32, first and second clutches 33, 34, a single counter shaft 35, a first speed-change gear group 36, and a second speed-change gear group 37. The first and second main shafts 31, 32 extend in the horizontal direction in parallel with each other so as to have respective different axes. The first and second clutches 33, 34 are coaxially supported by the corresponding right end portions of the main shafts 31, 32. The counter shaft 35 extends in the horizontal direction in parallel with the main shafts 31, 32 so as to have an axis different from those of the main shafts 31, 32. The first speed-change gear group 36 is installed to straddle the first main shaft 31 and the counter shaft 35. The second-speed gear group 37 is installed to straddle the second main shaft 32 and the counter shaft 35. The first speed-change gear group 36 is composed of a plurality of gear trains (gear pairs) for odd speed-change stages. The second speed-change gear group 37 is composed of a plurality of gear trains (gear pairs) for even speed-change stages. Incidentally, symbols C3, C4 and C5 denote corresponding rotational central axes (a first main axis, a second main axis and a counter axis), of the main shafts 31, 32 and of the counter shaft 35, extending in the horizontal direction.

The transmission 23 can transmit power selectively using any one of the gear trains. During usual operation with a speed-change stage fixed, one of the clutches 33, 34 is brought into an engaged state and the other into a disengaged state. Any of the gear trains connected to the clutch in the engaged state is used to perform power transmission and a gear train previously selected from the gear trains connected to the clutch in the disengaged state is used to create a possible power transmission state. From this state, the clutch in the engaged state is brought into the disengaged state and the clutch in the disengaged state is brought into the engaged state (by changing the clutches 33, 34). In this way, the speed-change stage is switched between the odd speed-change stages and the even speed-change stages.

Referring to FIGS. 3 and 4, each of the clutches 33, 34 is a wet type multiplate clutch having a plurality of clutch plates 41 alternately overlapping each other in the axial direction thereof and is housed in the right portion (in a clutch chamber 14c) of the crankcase 14. Incidentally, reference numeral 14b identifies a clutch cover which covers the clutch chamber 14c.

Figure 5:
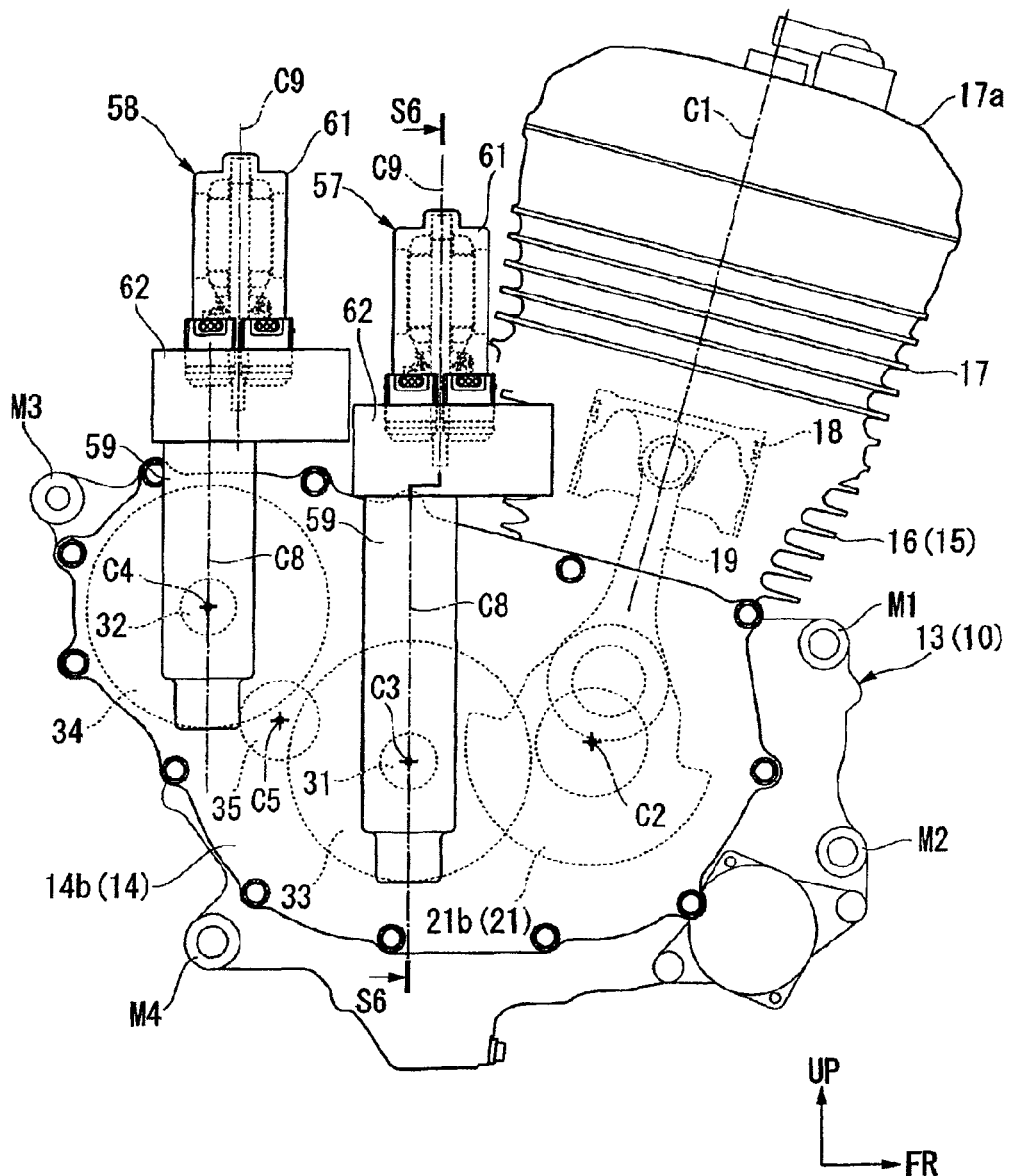
FIG. 5 is a right lateral view of the power unit including clutch actuators.
Figure 6:
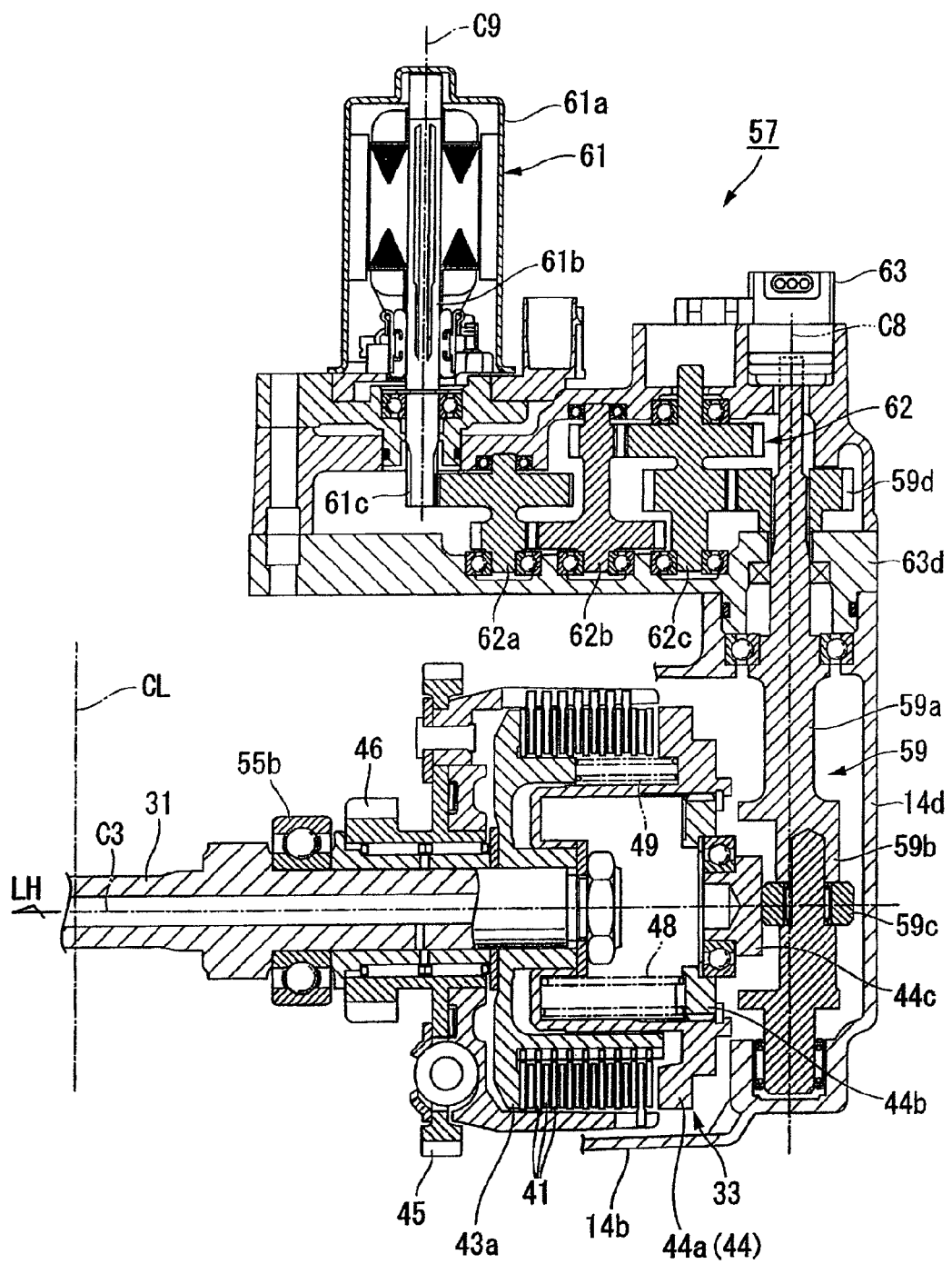
FIG. 6 is a cross-sectional view taken along line S6-S6 in FIG. 5.

Each of the clutches 33, 34 is of a mechanical type in which the clutch plates 41 are frictionally engaged with each other by a pressing force applied from a corresponding one of clutch actuators 57, 58 (see FIGS. 5 and 6). Incidentally, the illustrations of the clutch actuators 57, 58 are omitted in FIGS. 3 and 4 for ease of illustration.

The clutches 33, 34 are arranged not to overlap each other as viewed in side elevation, whereby the horizontal width of the power unit 10 is reduced (see FIG. 2). The clutches 33, 34 are arranged to avoid the journal portion 21c of the crankshaft 21 and the pivot shaft 27 as viewed in side elevation. The clutches 33, 34 are arranged at a position as high as possible so as to suppress splash of engine oil.

The second clutch 34 is located at the rear portion of the crankcase 14. In addition, the second clutch 34 is displaced largely upward with respect to the counter shaft 35 and has a front end portion located forward of the axis C5 of the counter shaft 35 in order to achieve the following purposes: The pivot shaft 27 can be disposed at a position obliquely downward of and rearward of the second clutch 34 and the anteroposterior length of the overall unit can be reduced. A portion, housing the second clutch 34, of the rear portion of the crankcase 14, along with the second clutch 34, protrudes above the pivot shaft 27.

The rear portion of the first clutch 33 and the front portion of the second clutch 34 have respective anteroposterior positions overlapping each other. In addition, the upper portion of the first clutch 33 and the lower portion of the second clutch 34 have respective vertical positions overlapping each other.

The rear portion of the second clutch 34 and the front portion of the pivot shaft 27 have respective anteroposterior positions overlapping each other. In addition, the lower portion of the second clutch 34 and the upper portion of the pivot shaft 27 have respective vertical positions overlapping each other.

The transmission 23 is of a constant-mesh type in which a drive gear and a driven gear corresponding to each of the speed-change stages are constantly meshed with each other. The gears are broadly divided into free gears each relatively rotatable with respect to a shaft supporting itself and slide gears, each spline-fitted to the shaft mentioned above. The change mechanism 51 is operated to axially shift the slide gear, whereby each gear is switched to power transmission using a gear train corresponding to any one of the speed-change stages.

Referring to FIG. 2, the first main shaft 31 is disposed such that its axis C3 is located at a position behind and slightly below the crank axis C2. Specifically, the first main axis C3 is disposed below a substantially horizontal reference line BL connecting the crank axis C2 with the pivot axis C7 as viewed from the side. In addition, the first main shaft 31 is disposed close to the reference line BL, so as to have an upper end crossing the reference line BL.

The second main shaft 32 is disposed such that its axis C4 is located obliquely rearward of and above the first main axis C3 and obliquely forward of and above the pivot axis C7. Specifically, the second main axis C4 is disposed above the reference line BL as viewed from the side at such height that the visible outline of the second clutch 34 is away from the reference line BL.

The counter shaft 35 is disposed such that its axis C5 is located at a position behind and slightly above the first main axis C3. Specifically, the counter axis C5 is disposed above the reference line BL as viewed from the side and the counter shaft 35 is disposed close to the reference line BL so as to have a lower end crossing the reference line BL.

The counter axis C5 is disposed at a position below a rearward upward inclined line SL connecting the main axes C3, C4 together in a direction perpendicular to the inclined line SL as viewed from the side. The first main shaft 31, the counter shaft 35 and the second main shaft 32 are arranged in this order from the crankshaft 21 toward the back. In addition, they are arranged at respective upper positions as being away from the crankshaft 21 toward the back. Incidentally, symbol VSL in the figure identifies an inclined orthogonal line passing through the counter axis C5 and being orthogonal to the inclined line SL. This inclined orthogonal line VSL corresponds to a perpendicular bisector of the inclined line SL.

As described above, the second main shaft 32 and the second clutch 34 located at the rear portion of the crankcase 14 so as to be away from the crankshaft 21 toward the back is disposed at a relatively high position. Therefore, the pivot shaft 27 can be disposed at a vertical position equal to the crankshaft 21 and rearward of and below the crankcase 14. In addition, the pivot shaft 27 can be disposed as anteriorly (crankshaft 21 side) as possible (that is, the inter-axis distance between the pivot shaft 27 and the crankshaft 21 can be reduced).

The second inclined line SL2 connects the pivot axis C7 with the counter axis C5 and extends rearward downward as viewed from the side. The first main axis C3 is disposed below the second inclined line SL2 and the second main axis C4 is disposed above the second inclined line SL2. Similarly, the third inclined line SL3 connects the crank axis C2 with the counter axis C5 and extends rearward upward as viewed from the side. The first main axis C3 is disposed below the third inclined line SL3 and the second main axis C4 is disposed above the third inclined line SL3.

A shift drum 52 of the change mechanism 51 is disposed above the first main shaft 31 and forward of the second main shaft 32.

The change mechanism 51 includes a hollow cylindrical shift drum 52 parallel to the shafts 31, 32, 35 and four shift forks 53a to 53d engaged with four respective lead grooves (not shown) formed on the outer circumference of the shift drum 52. The shift forks 53a to 53d are individually axially shifted in accordance with the patterns of the lead grooves by the turning of the shift drum 52 to individually axially shift corresponding shifters 40a to 40d described later of the transmission 23. In this way, gears are arbitrarily selected that are used for power transmission between one of the main shafts 31, 32 and the counter shaft 35 in the transmission 23 (the gears are established as power transmission elements).

Incidentally, symbol C6 in the figure denotes a rotational central axis (the drum axis), of the shift drum 52, extending in the horizontal direction. The drum axis C6 is disposed at a position above the inclined line SL in a direction perpendicular thereto as viewed from the side. The drum axis C6, along with the counter axis C5, is located on the inclined orthogonal line VSL as viewed from the side. The drum axis C6 is further away from the inclined line SL than the counter axis C5. The shift forks 53a to 53d are installed substantially line-symmetrically with respect to the inclined orthogonal line VSL as viewed from the side.

Referring to FIG. 3, a left end portion of the first main shaft 31 is rotatably supported by the left lateral wall portion 14a of the crankcase 14 via a left radial needle bearing 55a. A right end portion of the first main shaft 31 is rotatably supported by the right lateral wall portion of the crankcase 14 via a right radial ball bearing 55b. The first clutch 33 is coaxially supported by a portion, of the first main shaft 31, extending rightward from the right radial ball bearing 55b.

Referring to FIG. 4, a left end portion of the second main shaft 32 is rotatably supported by the left lateral wall portion 14a of the crankcase 14 via a left radial needle bearing 56a. A right end portion of the second main shaft 32 is rotatably supported by the right lateral wall portion 14a of the crankcase 14 via a right radial ball bearing 56b. The second clutch 34 is coaxially supported by a portion, of the second main shaft 32, extending rightward from the right radial ball bearing 56b.

Referring to FIG. 3, the first clutch 33 includes a clutch outer 42, a clutch inner 43, the plurality of clutch plates 41 and a pressure unit 44. The clutch outer 42 is formed like a bottomed cylinder coaxial with the first main shaft 31 and supported by the first main shaft 31 for relative rotation to constantly transmit rotational power between the crankshaft 21 and the clutch outer 42. The clutch inner 43 is formed like a bottomed cylinder similarly to the clutch outer 42, disposed coaxially on the inner circumferential side thereof and supported by the first main shaft 31 for integral rotation. The clutch plates 41 are axially stacked between the cylindrical walls of the clutch outer 42 and of the clutch inner 43. The pressure unit 44 is adapted to press leftward the clutch plates 41 (hereinafter, sometimes called the clutch plate group 41) coaxially disposed on the opening side of the clutch inner 43 and stacked one on another.

A large-diameter transmission gear (a primary driven gear) 45 is mounted to a bottom wall of the clutch outer 42 from the left side via a damper 45a, the transmission gear 45 having a larger diameter than the bottom wall. The primary drive gear 22 installed on the right end of the crankshaft 21 is meshed with the transmission gear 45. A small-diameter transmission gear 46 having a relatively small diameter is formed integrally with the large-diameter transmission gear 45 at a position on the inner circumferential left side. An idle gear 47 rotatably supported by the right end portion of the counter gear is meshed with the small-diameter transmission gear 46. Also the large-diameter transmission gear 45 of the second clutch 34 described later is meshed with the idle gear 47.

Objects (clutch disks 41a), of the clutch plates 41, supported by the clutch outer 42 are supported for integral rotation and for axial displacement by the cylindrical wall of the clutch outer 42 from the inner circumferential side thereof. Objects (clutch plates 41b), of the clutch plates 41, are supported for integral rotation and for axial displacement by the cylindrical wall of the clutch inner 43 from the outer circumferential side thereof. A left pressuring flange 43a is formed integrally with the outer circumference of the bottom wall of the clutch inner 43. This left pressuring flange 43a is adjacent to the left lateral surface of the clutch plate group 41 from the left.

A right pressuring flange 44a of the pressure unit 44 is adjacent to the right lateral surface of the clutch plate group 41 from the right. The right pressuring flange 44a is displaced leftward by the operation of the clutch actuators 57, 58 described later. In this way, the clutch plate group 41 is held and pressurized between the left and right pressing flanges 43a, 44a for integral friction engagement, which leads to clutch engagement capable of torque transmission between the clutch outer 42 and the clutch inner 43. On the other hand, the right pressing flange 44a is displaced rightward to release the friction engagement, which leads to clutch disengagement incapable of the torque transmission.

The pressure unit 44 includes the right pressing flange 44a capable of rotation integral with the clutch inner 43; a pressing ring 44b disposed on the inner circumference of the right end portion of the right pressing flange 44a and being capable of leftward pressing the right pressing flange 44a via a clutch spring 48; and a pressing cap 44c engaged with the inner circumference of the pressing ring 44b for relative rotation via a radial ball bearing 44d and being capable of leftward pressing the pressing ring 44b.

A rotating shaft 59a (a camshaft) of each of the clutch actuators 57, 58 described later is disposed rightward of the pressing cap 44c. The rotating shaft 59a presses the pressing cap 44c, the pressing ring 44b and the right pressing flange 44a to bring the clutch plate group 41 into friction engagement. On the other hand, if the pressing is released, a return spring 49 installed between the right pressing flange 44a and the clutch inner 43 operates to shift the right pressing flange 44a rightward, which releases the friction engagement.

Incidentally, the second clutch 34 has the same configuration as that of the first clutch 33 (see FIG. 4). Therefore, identical portions are identified with like reference numerals and their detailed explanations are omitted.

Referring to FIGS. 2, 3 and 4, rotational power is inputted from the primary drive gear 22 (the crankshaft 21) via the large-diameter transmission gear 45 to the clutch outer 42 of the first clutch 33.

On the other hand, the rotational power of crankshaft 21 is transmitted to the clutch outer 42 of the second clutch 34 via the primary drive gear 22, the large-diameter transmission gear 45 of the first clutch 33, the small-diameter transmission gear 46 of the first clutch 33, the idle gear 47, the small-diameter transmission gear 46 of the second clutch 34 and the large-diameter transmission gear 45 of the second clutch 34 in this order.

The speed-change gear groups 36, 37 constitute speed-change stages for six speeds.

The first speed-change gear group 36 is composed of first-, third-, and fifth-speed gear trains 36a, 36c, 36e corresponding to odd stages (first, third and fifth speeds). In addition, the first speed-change gear group is installed to span between the left lateral portions of the first main shaft 31 and of the counter shaft 35.

On the other hand, the second speed-change gear group 37 is composed of second-, fourth-, and sixth-speed gear trains 37b, 37d, 37f corresponding to even stages (second, fourth and sixth speeds). In addition, the second speed-change gear group 37 is installed to span between the right lateral portions of the second main shaft 32 and of the counter shaft 35.

A gear train of any one of the speed-change groups 36, 37 is uniquely established. The rotational power of the crankshaft 21 inputted to any one of the main shafts 31, 32 is reduced in speed at a given reduction ratio and then transmitted to the countershaft 35.

The first-speed gear train 36a is composed of a first-speed drive gear 38a and a first-speed driven gear 39a. The first-speed drive gear 38a is supported for integral rotation at a position adjacent to the right of the left end portion (a left journal portion 31a supported by the crankcase 14) of the first main shaft 31. The first-speed driven gear 39a is supported for relative rotation at a position adjacent to the right of the left end portion (a left journal portion 35a supported by the crankcase 14) of the counter shaft 35.

The first main shaft 31 has a right end portion formed as a right journal portion 31b supported by the crankcase 14. The right end portion of the first main shaft 31 projects into the clutch chamber 14c on the right side of the crankcase 14. The first clutch 33 is mounted to this projecting portion.

The counter shaft 35 has a left end portion (a left journal portion 35a) projecting into the outside of the crankcase 14. A drive portion (a drive sprocket in the FIG. 35 of the transmitting mechanism is mounted to this projecting portion.

The second shifter 40b capable of integral rotation with the counter shaft 35 and of axial displacement is adjacent to the right of the first-speed driven gear 39a. The second shifter 40b is axially displaced and engaged with the first driven gear 39a for integral rotation. In this way, the rotational power of the crankshaft 21 inputted to the first main shaft 31 is reduced in speed through the first-speed gear train 36 and transmitted to the counter shaft 35.

The second-speed gear train 37b is composed of a second-speed drive gear 38b and a second-speed driven gear 39b. The second-speed drive gear 38b is formed, e.g., integrally with the second main shaft 32 at a position adjacent to the left of the right end portion (a right journal portion 32b supported by the crankcase 14) of the second main shaft 32. The second-speed driven gear 39b is supported for relative rotation at a position adjacent to the left of the right end portion (a right journal portion 35b supported by the crankcase 14) of the counter shaft 35.

The right end portion (the right journal portion 32b) of the second main shaft 32 projects into the clutch chamber 14c. In addition, the second clutch 34 is mounted to this projecting portion.

The right end portion (the right journal portion 35b) of the counter shaft 35 projects into the clutch chamber 14c. In addition, the idle gear 47 is supported by this projecting portion for relative rotation.

The second main shaft 32 has a left end portion formed as a left journal portion 32a supported by the crankcase 14.

The second shifter 40b capable of integral rotation with the counter shaft 35 and of axial displacement is adjacent to the left of the second driven gear 39b. The second shifter 40b is axially displaced and engaged with the second driven gear 39b for integral rotation. In this way, the rotational power of the crankshaft 21 inputted to the second main shaft 32 is reduced in speed via the second-speed gear train 37b and transmitted to the counter shaft 35.

The third-speed gear train 36c is composed of a third-speed gear train 38c and a third-speed driven gear 39c. The third-speed drive gear 38c is supported for integral rotation at a position on the left of a horizontal intermediate portion of a portion (a gear support portion) between the left and right journal portions 31a, 31b of the first main shaft 31. The third-speed driven gear 39c is supported for relative rotation at a position on the left of a horizontal intermediate portion of a portion (a gear support portion) between the left and right journal portions 35a, 35b of the counter shaft 35.

The third-speed driven gear 39c is formed integrally with the outer circumferential right side of the third shifter 40c supported for integral rotation with the first main shaft 31 and for axial displacement.

The first shifter 40a is adjacent to the left of the third-speed driven gear 39c. The first shifter 40a is axially displaced and engaged with the third-speed driven gear 39c for integral rotation. In this way, the rotational power of the crankshaft 21 inputted to the first main shaft 31 is reduced in speed via the third-speed gear train 36c and transmitted to the counter shaft 35.

The third-speed drive gear 38c is located at the same horizontal position as the left crank web 21b. The left crank web 21 is formed with a cutout "cut" at the most outer circumferential position of the left crank web 21b so as to avoid the third-speed drive gear 38c (see FIG. 3). This makes it possible to bring the first main shaft 31 and the crankshaft 21 as close to each other as possible.

The fourth-speed gear train 37d is composed of a fourth-speed drive gear 38d and a fourth-speed driven gear 39d. The fourth-speed gear train 37d is supported for integral rotation at a position on the right of the horizontal intermediate portion of a portion (a gear support portion) between the left and right journal portions 32a, 32b of the second main shaft 32. The fourth-speed driven gear 39d is supported for relative rotation at a position on the right of a horizontal intermediate portion of the gear support portion of the counter shaft 35.

The fourth-speed drive gear 38d is integrally formed on the outer circumferential left side of the fourth shifter 40d supported for integral rotation with the second main shaft 32 and for axial displacement.

The second shifter 40b is adjacent to the right of the fourth-speed driven gear 39d. The second shifter 40b is axially displaced and engaged with the fourth-speed driven gear 39d for integral rotation. In this way, the rotational power of the crankshaft 21 inputted to the second main shaft 32 is reduced in speed via the fourth-speed gear train 37 and transmitted to the counter shaft 35.

The fifth-speed gear train 36e is composed of a fifth-speed drive gear 38e and a fifth-speed driven gear 39e. The fifth-speed drive gear 38e is supported for relative rotation by the first main shaft 31 at a position adjacent to the right of the first-speed drive gear 38a. The fifth-speed driven gear 39e is supported for integral rotation by the counter shaft 35 at a position adjacent to the right of the first-speed driven gear 39a.

The fifth-speed driven gear 39e is formed integrally with the outer circumferential left side of the first shifter 40a.

The third shifter 40c is adjacent to the right of the fifth-speed drive gear 38e. The third shifter 40c is axially displaced and engaged with the fifth-speed drive gear 38e for integral rotation. In this way, the rotational power of the crankshaft 21 inputted to the first main shaft 31 is reduced in speed via the fifth-speed gear train 36e and transmitted to the counter shaft 35.

The fifth-speed drive gear 38e has the largest diameter among the gears, supported by the first main shaft 31, in the first speed-change gear group 36. In addition, the fifth-speed drive gear 38e is located at the same horizontal position as the left crank bearing 24. The outer circumference of the left crank bearing 24 has a smaller diameter than a generator chamber GR on the left thereof and has a smaller diameter than the crank web 21b on the right thereof. In addition, the fifth-speed drive gear 38e having a relatively large diameter is disposed on the outer circumferential side of the left crank bearing 24. Thus, it is possible to bring the first main shaft 31 and the crankshaft 21 close to each other.

The sixth-speed gear train 37f is composed of a six-speed drive gear 38f and a sixth-speed driven gear 39f. The sixth-speed drive gear 38f is supported for relative rotation by the second main shaft 32 at a position adjacent to the left of the second-speed drive gear 38b. The sixth-speed driven gear 39f is supported for integral rotation by the counter shaft 35 at a position adjacent to the left of the second-speed driven gear 39b.

The sixth-speed driven gear 39f is formed integrally with the outer circumferential right side of the second shifter 40b.

The fourth shifter 40d is adjacent to the left of the sixth-speed drive gear 38f. The fourth shifter 40d is axially displaced and engaged with the sixth-speed drive gear 38f for integral rotation. In this way, the rotational power of the crankshaft 21 inputted to the second main shaft 32 is reduced in speed via the sixth-speed gear train 37f and transmitted to the counter shaft 35.

The drive gears 38a to 38f are reduced in diameter in the order from the first-speed to the sixth-speed. In addition, the driven gears 39a to 39f are increased in diameter in the order from the first-speed to the sixth speed.

Specifically, the second-speed drive gear 38b has a smaller diameter than the first-speed drive gear 38a. The fourth-speed drive gear 38d has a smaller diameter than the third-speed drive gear 38c. The sixth-speed drive gear 38f has a smaller diameter than the fifth-speed drive gear 38e.

The second-speed driven gear 39b has a large diameter than the first-speed driven gear 39a. The fourth-speed driven gear 39d has a larger diameter than the third-speed driven gear 39c. The sixth-speed driven gear 39f has a larger diameter than the fifth-speed driven gear 39e.

Because of the above, it can be said that the drive gears 38a, 38c, 38e for the odd stages totally have the smaller diameters than the drive gears 38b, 38d, 38f for the even stages.

The drive gears 38a, 38c, 38e for the odd stages as described above are supported by the first main shaft 31 close to the crankshaft 21. The first main shaft 31 and then the transmission 23 can be brought as close to the crankshaft 21 as possible compared with the case where the drive gears 38b, 38d, 38f for the even stages are supported by the first main shaft 31. Thus, the downsizing of the power unit 10 can be achieved.

The shift drum 52 of the change mechanism 51 is turnably supported inside the upper portion of the crankcase 14 (above the first main shaft 31 and forward of the second main shaft 32). The proximal ends of the first to fourth shift forks 53a to 53d are each engaged with a corresponding one of the lead grooves on the outer circumference of the shift drum 52.

The shift forks 53a to 53d are each formed in a folding-fan shape on its leading end side. The respective leading end portions of the shift forks 53a to 53d are each engaged with a corresponding one of the shifters 40a to 40d. The shift forks 53a to 53d and the shifters 40a to 40d are axially displaced by the turning of the shift drum 52 in accordance with the patterns of the lead grooves. In this way, any one of the gear trains is uniquely established.

An ECU (not shown) as a controller of the transmission 23 operatively controls the clutches 33, 34 and the shift drum 52 on the basis of the information detected by various sensors. Thus, the speed-change stages (the shift positions) of the transmission 23 are changed.

Specifically, the transmission 23 brings only one of the clutches 33, 34 into the engage state and uses any one of the speed-change gear trains linked to such a clutch to perform power transmission. The transmission 23 previously selects a speed-change gear train that will be next established, from the speed-change gear trains linked to the other of the clutches 33, 34. In this state, the transmission 23 simultaneously performs the disengagement of the one of the clutches and the engagement of the other. In this way, the transmission 23 is switched to the power transmission using the previously selected speed-change gear train and is upshifted or downshifted.

After the start of the engine and when the motorcycle 1 is brought to a halt, the transmission 23 keeps the clutches 33, 34 in the disengaged state. In addition, the transmission 23 is brought into a first-speed state where the first-speed gear (the first-speed gear train 36a) is established as the preparation for the start of the motorcycle 1 from the neutral state where the power transmission through any one of the shift gear trains is disabled. From this state, for example, the engine is increased in rotating speed, the first clutch 33 is brought into the engagement through partial clutch engagement and the motorcycle 1 is started.

During the traveling of the motorcycle 1, while bringing only one of the clutches, corresponding to the current shift position into engagement, the transmission 23 previously establishes a speed-change gear train corresponding to the next shift position from the speed-change gear trains linked to the other clutches in the disengagement state on the basis of the vehicle drive information.

Specifically, if a current shift position is at an odd stage (or an even stage), the next shift position is at an even stage (or an odd stage). Therefore, the rotational power of the crankshaft 21 is inputted to the first main shaft 31 (or the second main shaft 32) via the first clutch 33 (or the second clutch 34) in the engaged state. In this case, the second clutch 34 (or the first clutch 33) is in the disengaged state; therefore, the rotational power of the crankshaft 21 is not inputted to the second main shaft 32 (or the first main shaft 31).

Thereafter, if the ECU determines that shift timing is reached, the first clutch 33 (or the second clutch 34) in the engaged state is brought into the disengaged state and the second clutch 34 (or the first clutch 33) in the disengaged state is brought into the engaged state. Only by this operation the transmission 23 can be switched to the power transmission using a speed-change gear train corresponding to the previously established next shift position. Thus, quick and smooth shifting is done without a time lag during shifting and the discontinuity of the power transmission.

Referring to FIGS. 5 and 6, respective pressing mechanisms 59 of first and second clutch actuators 57, 58 adapted to apply pressing force (engaging force) to corresponding clutches 33, 34 are installed on the right external lateral surface of the crankcase 14. Incidentally, FIG. 6 shows the first clutch actuator 57 corresponding to the first clutch 33. Also the second clutch actuator 58 corresponding to the second clutch 34 has the same configuration as that of the first clutch actuator 57.

Each of the clutch actuators 57, 58 includes the pressing mechanism 59, an electric motor 61 and a reduction gear mechanism 62. The pressing mechanism 59 has a turning shaft 59a disposed perpendicularly to the main axis C3 and extending along the vertical direction. The electric motor 61 is disposed parallel to the turning shaft 59a and adapted to apply rotational power to the turning shaft 59a. The reduction gear mechanism 62 connects the turning shaft 59a with the electric motor 61. Incidentally, symbol C8 in the figure denotes a turning central axis extending in the extending direction of the turning shaft 59a. Symbol C9 denotes a drive central axis, of the electric motor 61, parallel to the turning central axis C8.

The turning shaft 59a of the pressing mechanism 59 is turnably supported in a cylindrical mechanism-housing portion 14d formed integrally with the clutch cover 14b. The turning shaft 59a has an eccentric shaft 59b installed at a portion bisecting the main axis C3 and an eccentric roller 59c coaxially supported by the eccentric shaft 59b. The eccentric roller 59c has an outer circumferential surface brought into contact with the right end face of the pressing cap 44c of the first clutch 33. When the eccentric shaft 59b and the eccentric roller 59c are displaced rightward, the clutch plate group 41 is brought into the clutch disengaged state without being held and pressurized. When the eccentric shaft 59b and the eccentric roller 59c are displaced leftward, the clutch plate group 41 is held and pressurized, and brought into the clutch engaged state.

The electric motor 61 is such that a drive shaft 61b has a leading end portion projection downward from a motor main body 61a thereof. The leading end portion of the drive shaft 61b is formed with a pinion gear 61c. This pinion gear 61c is located at almost the same height as a driven gear 59d coaxially attached to the upper end portion of the turning shaft 59a.

The reduction gear mechanism 62 connecting the pinion gear 61c with the driven gear 59d is such that three reduction gear shafts 62a to 62c are rotatably supported in the casing 62d. The reduction gear shafts 62a to 62c is formed integrally with corresponding large and small spur gears. The reduction gear mechanism 62 and the electric motor 61 are installed behind the cylinder 15 so as to protrude above the crankcase 14. Incidentally, reference numeral 63 in the figure identifies a turning sensor (a clutch disengagement-engagement sensor) coaxially disposed above the drive shaft 61b. Symbol CL denotes a horizontal central line of the power unit 10 and of the motorcycle 1.

As described above, the motorcycle 1 in the embodiment described above includes the power unit 10, the swing arm 9 supporting the drive wheel (the rear wheel 11), and the pivot shaft 27 disposed parallel to the first and second main shaft 31, 32 and to the counter shaft 35 and vertically swingably supporting the swing arm 9. The power unit 10 includes the crankshaft 21; the first and second main shafts 31, 32 disposed in this order from the crankshaft 21 side; the single counter shaft 35 straddling and engaging the main shafts 31, 32; the crankcase 14 rotatably supporting the crankshaft 21, the main shafts 31, 32 and the counter shaft 35 in parallel with one another; the first and second clutches 33, 34 installed at the corresponding one end portions of the main shafts 31, 32 and individually connecting and disconnecting the transmission of the rotational power from the crankshaft 21 to the main shafts 31, 32; the plurality of gear trains 36a, 36c, 36e, 37b, 37d, 37f for the speed-change stages located between each of the main shafts 31, 32 and the counter shaft 35 and established selectively. The power unit 10 switches the speed-change stages by changing the clutches 33, 34.

In the motorcycle 1, the line (the second inclined line SL2) connecting the axial center (the counter axis C5) of the counter shaft 35 with the axial center (the pivot axis C7) of the pivot shaft 27 is inclined rearward downward, as viewed in side elevation from the axial direction of the shafts 31, 32, 35. One (the second main axis C4) of the respective axial centers (the main axial centers C3, C4) of the main shafts 31, 32 is disposed on one (obliquely downward and upward) of the sides with respect to the line and the other (the first main shaft C3) is disposed on the other side (obliquely forward and downward).

The motorcycle 1 is such that one (the second main shaft 32) of the respective axial centers (the main axes C3, C4) of the main shafts 31, 32 is disposed above the second line (the reference line BL) connecting the axial center (the crank axis C2) of the crankshaft 21 with the axial center (the pivot axis C7) of the pivot shaft 27 and the other (the first main shaft 31) is disposed below the second line as viewed in side elevation from the axial direction of the shafts 31, 32, 35.

With this configuration, the main shafts 31, 32 are disposed so as to be offset (to be vertically divided) from each other with respect to the lines (the second inclined line SL2, the reference line BL). Therefore, the distance from the crankshaft 21 to the pivot shaft 27 can be shortened, so that the vicinity of the power unit 10 can be downsized. The main shafts 31, 32 are disposed so as to be divided anteroposteriorly with the rearward downward inclined second inclined line SL2 located therebetween. Therefore, the height of the crankcase 14 can be reduced.

Incidentally, the present invention is not limited to the embodiment described above. For example, the engine of the power unit includes not only the air-cooled single-cylinder engine but also, of course, a water-cooled engine, a parallel or V-type multi-cylinder engine, a longitudinal-mounted engine in which a crankshaft extends in the back and forth direction of a vehicle, and reciprocating engines of various types.

The straddle-ride type vehicle includes all vehicles in which a driver straddles and mounts a vehicle body. In addition, the straddle-ride type vehicle includes not only motorcycles (including a scooter-type vehicle) but also three-wheeled vehicles (including front-one- and rear-two-wheeled vehicles and front-two- and rear-one-wheeled vehicles) and four-wheeled vehicles.

The configuration of the embodiment described above is one example of the present invention and can be modified in various ways not departing from the gist of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A straddle-ride type vehicle comprising:
    a power unit, said power unit including:
        a crankshaft;
        first and second main shafts disposed in this order from the crankshaft side;
        a counter shaft straddling and engaging the first and second main shafts;
        a crankcase rotatably supporting the crankshaft, the first and second main shafts and the counter shaft in a parallel manner;
        first and second clutches installed at corresponding one end portions of the main shafts and individually connecting and disconnecting the transmission of rotational power from the crankshaft to the main shafts; and
        a plurality of gear trains for speed-change stages, each of the plurality of gear trains being located on a corresponding one of the main shafts and the counter shaft and being selectively established by turning of a shift drum parallel to the main shafts and the counter shaft;
    a swing arm supporting a drive wheel at a rear portion; and
    a pivot shaft disposed behind the crankcase and parallel with the first and second main shafts and with the counter shaft and vertically swingably supporting a front portion of the swing arm,
    wherein the power unit in configured to switch the speed-change stages by changing the clutches and transmitting power to the drive wheel from an end portion of the counter shaft projecting from the crankcase, and
    wherein one of respective axial centers of the first and second main shafts is disposed on one side with respect to a line and the other of respective axial centers of the first and second main shafts is disposed on the other side of said line, said line connecting an axial center of the counter shaft with an axial center of the pivot shaft, as viewed in side elevation from the axial direction of the first and second main shafts and the counter shaft.

2. The straddle-ride type vehicle according to claim 1, wherein as viewed in side elevation from the axial direction of the first and second main shafts and the counter shaft, the line is inclined rearward downward and one of the respective axial centers of the first and second main shafts is disposed obliquely rearward of and above the line and the other of the respective axial centers of the first and second main shafts is disposed obliquely forward of and below the line.

3. The straddle-ride type vehicle according to claim 1, wherein as viewed in side elevation from the axial direction of the first and second main shafts and the counter shaft, one of the respective axial centers of the first and second main shafts is disposed above a second line and the other of the respective axial centers of the first and second main shafts is disposed below the second line, the second line connecting the axial center of the crankshaft with the axial center of the pivot shaft.

4. The straddle-ride type vehicle according to claim 3, wherein as viewed in side elevation from the axial direction of the first and second main shafts and the counter shaft, said one of the first and second main shafts does not overlap with the second line, and said other of the first and second main shafts overlaps with the second line.

5. The straddle-ride type vehicle according to claim 4, wherein as viewed in side elevation from the axial direction of the first and second main shafts and the counter shaft, the counter shaft is disposed such that an axial center of the counter shaft is located above the second line, and the counter shaft overlaps with the second line.

6. The straddle-ride type vehicle according to claim 1, wherein as viewed in side elevation from the axial direction of the first and second main shafts and the counter shaft, one of the respective axial centers of the first and second main shafts is disposed above a third line and the other of the respective axial centers of the first and second main shafts is disposed below the third line, the third line connecting the axial center of the crankshaft with the axial center of the counter shaft.

7. The straddle-ride type vehicle according to claim 1, wherein the clutches are disposed to vertically overlap each other at least in part.

8. The straddle-ride type vehicle according to claim 1, wherein a portion, located on a rear side, of each of the clutches and the pivot shaft are disposed to vertically overlap each other at least in part.

9. The straddle-ride type vehicle according to claim 1, wherein a portion, located on a rear side, of each of the clutches is disposed above each of the lines.

10. A vehicle comprising:
    a power unit, said power unit including:
        a crankshaft;
        first and second main shafts;
        a counter shaft; and
        a crankcase rotatably supporting the crankshaft, the first and second main shafts and the counter shaft in a parallel manner; and
    a pivot shaft disposed behind the crankcase and parallel with the first and second main shafts and with the counter shaft and vertically swingably supporting a front portion of a swing arm,
    wherein one of respective axial centers of the first and second main shafts is disposed on one side with respect to a line and the other of respective axial centers of the first and second main shafts is disposed on the other side of said line, said line connecting an axial center of the counter shaft with an axial center of the pivot shaft, as viewed in side elevation from the axial direction of the first and second main shafts and the counter shaft.

11. The straddle-ride type vehicle according to claim 10, wherein as viewed in side elevation from the axial direction of the first and second main shafts and the counter shaft, the line is inclined rearward downward and one of the respective axial centers of the first and second main shafts is disposed obliquely rearward of and above the line and the other of the respective axial centers of the first and second main shafts is disposed obliquely forward of and below the line.

12. The straddle-ride type vehicle according to claim 10, wherein as viewed in side elevation from the axial direction of the first and second main shafts and the counter shaft, one of the respective axial centers of the first and second main shafts is disposed above a second line and the other of the respective axial centers of the first and second main shafts is disposed below the second line, the second line connecting the axial center of the crankshaft with the axial center of the pivot shaft.

13. The straddle-ride type vehicle according to claim 12, wherein as viewed in side elevation from the axial direction of the first and second main shafts and the counter shaft, said one of the first and second main shafts does not overlap with the second line, and said other of the first and second main shafts overlaps with the second line.

14. The straddle-ride type vehicle according to claim 13, wherein as viewed in side elevation from the axial direction of the first and second main shafts and the counter shaft, the counter shaft is disposed such that an axial center of the counter shaft is located above the second line, and the counter shaft overlaps with the second line.

15. The straddle-ride type vehicle according to claim 10, wherein as viewed in side elevation from the axial direction of the first and second main shafts and the counter shaft, one of the respective axial centers of the first and second main shafts is disposed above a third line and the other of the respective axial centers of the first and second main shafts is disposed below the third line, the third line connecting the axial center of the crankshaft with the axial center of the counter shaft.

16. The straddle-ride type vehicle according to claim 10, wherein the clutches are disposed to vertically overlap each other at least in part.

17. The straddle-ride type vehicle according to claim 10, wherein a portion, located on a rear side, of each of the clutches and the pivot shaft are disposed to vertically overlap each other at least in part.

18. The straddle-ride type vehicle according to claim 10, wherein a portion, located on a rear side, of each of the clutches is disposed above each of the lines.

* * * * *